US009866577B2

(12) United States Patent
Laniepce et al.

(10) Patent No.: US 9,866,577 B2
(45) Date of Patent: Jan. 9, 2018

(54) METHOD FOR DETECTING INTRUSIONS ON A SET OF VIRTUAL RESOURCES

(75) Inventors: Sylvie Laniepce, Caen (FR); Fabien Bignon, Caen (FR); Karel Mittig, Caen (FR)

(73) Assignee: ORANGE, Paris (FR)

( * ) Notice: Subject to any disclaimer, the term of this patent is extended or adjusted under 35 U.S.C. 154(b) by 249 days.

(21) Appl. No.: 14/116,066

(22) PCT Filed: May 7, 2012

(86) PCT No.: PCT/FR2012/051009
§ 371 (c)(1),
(2), (4) Date: Feb. 19, 2014

(87) PCT Pub. No.: WO2012/153054
PCT Pub. Date: Nov. 15, 2012

(65) Prior Publication Data
US 2014/0189868 A1  Jul. 3, 2014

(30) Foreign Application Priority Data
May 6, 2011  (FR) ..................... 11 53914

(51) Int. Cl.
*H04L 29/06*  (2006.01)
*G06F 21/55*  (2013.01)
*G06F 21/57*  (2013.01)

(52) U.S. Cl.
CPC ........ *H04L 63/1433* (2013.01); *G06F 21/552* (2013.01); *G06F 21/577* (2013.01); *H04L 63/1416* (2013.01); *H04L 63/20* (2013.01)

(58) Field of Classification Search
CPC . H04L 63/1433; H04L 63/20; H04L 63/1416; G06F 21/552; G06F 21/577
USPC ........................................... 726/23
See application file for complete search history.

(56) References Cited

U.S. PATENT DOCUMENTS

| | | | | |
|---|---|---|---|---|
| 7,836,502 B1 * | 11/2010 | Zhao | ................... | G06F 21/6218 726/22 |
| 8,266,703 B1 * | 9/2012 | Magdych | ............ | H04L 63/1433 726/25 |
| 8,479,294 B1 * | 7/2013 | Li | ........................... | G06F 21/56 726/23 |
| 2007/0079377 A1 * | 4/2007 | Pagan | ................... | G06F 21/562 726/24 |

(Continued)

OTHER PUBLICATIONS

French Search Report and Written Opinion dated Nov. 14, 2011 for corresponding French Application No. 1153914, filed May 6, 2011.

(Continued)

*Primary Examiner* — Matthew Henning
(74) *Attorney, Agent, or Firm* — David D. Brush; Westman, Champlin & Koehler, P.A.

(57) ABSTRACT

A method for detecting intrusions on a set of virtual resources in a computer system including at least one physical machine hosting the set of virtual resources. The method includes: calculating an intrusion detection itinerary defined by a sequence of virtual resources from the set, the virtual resources being integrated and arranged in the sequence on the basis of respective vulnerability criticality levels assigned to the virtual resources of the set; and carrying out an intrusion detection operation, following the calculated itinerary.

11 Claims, 2 Drawing Sheets

(56) References Cited

U.S. PATENT DOCUMENTS

| | | | |
|---|---|---|---|
| 2008/0005796 A1* | 1/2008 | Godwood | G06F 21/564 |
| | | | 726/24 |
| 2008/0060074 A1* | 3/2008 | Okuyama | H04L 63/1441 |
| | | | 726/23 |
| 2008/0201780 A1 | 8/2008 | Kahn et al. | |
| 2008/0263658 A1* | 10/2008 | Michael | G06F 21/562 |
| | | | 726/22 |
| 2010/0161922 A1* | 6/2010 | Sharp | G06F 9/45558 |
| | | | 711/162 |
| 2010/0296496 A1* | 11/2010 | Sinha | H04W 12/12 |
| | | | 370/338 |
| 2012/0036580 A1* | 2/2012 | Gorny | H04L 63/1433 |
| | | | 726/25 |
| 2013/0269029 A1* | 10/2013 | Nakawatase | H04L 63/16 |
| | | | 726/22 |

OTHER PUBLICATIONS

Amir Vahid Dastjerdi et al: "Distributed Intrusion Detection in Clouds Using Mobile Agents", Advanced Engineering Computing and Applications in Sciences, 2009, ADVCOMP '09. Third International Conference on, IEEE, Piscataway, NJ, USA, Oct. 11, 2009 (Oct. 11, 2009), pp. 175-180, XP031584634.

Sebastian Ros et al: "Intrusion Detection in the Cloud", 2009 Eighth IEEE International Conference on Dependable, Autonomic and Secure Computing, Dec. 1, 2009 (Dec. 1, 2009), pp. 729-734, XP055011860.

Ganame A K et al: "Defining a simple metric for real-time security level evaluation of multi-sites networks", Parallel and Distributed Processing, 2008, IPDPS 2008. IEEE International Symposium on, IEEE, Piscataway, NJ, USA, Apr. 14, 2008 (Apr. 14, 2008), pp. 1-8, XP031268534.

Hao Chen et al: "Optimissing IDS Sensor Placement", Availability, Reliability, and Security, 2010, ARES '10 International Conference on, IEEE, Piscataway, NJ, USA, Feb. 15, 2010 (Feb. 15, 2010), pp. 315-320, XP031652926.

International Search Report and Written Opinion dated Jul. 5, 2012 for corresponding International Application No. PCT/FR2012/051009, filed May 7, 2012.

\* cited by examiner

METHOD FOR DETECTING INTRUSIONS ON A SET OF VIRTUAL RESOURCES

CROSS-REFERENCE TO RELATED APPLICATIONS

This Application is a Section 371 National Stage Application of International Application No. PCT/FR2012/051009, filed May 7, 2012, which is incorporated by reference in its entirety and published as WO 2012/153054 on Nov. 15, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present invention relates to a method for detecting intrusions in a so-called "cloud computing" environment.

It finds a particularly beneficial application in the securing of computing systems whose architecture is based on dematerialized computing resources, made available to a large number of users who access same remotely and in a manner which changes over time, that is to say on demand. Such an architecture is better known by the name cloud computing.

BACKGROUND OF THE DISCLOSURE

The concept of cloud computing has appeared recently to denote computing architectures in which computing processes traditionally located on user client stations of a company, or on servers of the company, are offloaded to remote servers. Remote hardware resources, distributed across the world, are thus accessed on demand via the Internet to create services accessible on-line by users. The applications and the data are no longer situated on the user's local computer, or on the server situated in this user's company, but in a cloud composed of a certain number of interconnected remote servers. With cloud computing, a company therefore no longer needs to set up its physical network infrastructure by itself. On the contrary, it can call upon a service provider that offers turnkey capabilities such as these.

With cloud computing, an aspect such as security is also offloaded to the service provider that proposes to operate the physical architecture instead of the company.

As regards the security of a computing architecture, diverse protection techniques exist, including the techniques for detecting intrusions, or "IDS" (for "Intrusion Detection System"). A system for detecting intrusions is a mechanism intended to spot abnormal or suspicious activities on a target, typically on a company network. It thus affords knowledge regarding successful or failed intrusion attempts. Various types of systems for detecting intrusions exist, including network IDS, or "NIDS" (for "Network Intrusion Detection System"). The principle of NIDS is to operate protection at the perimeter of a network constituting the observed system. Traffic at the boundary of this network is then captured at one or more points of interconnection of the observed network with a second network, for example the Internet network, and then analyzed by comparison with a set of known attack signatures and stored in libraries. An alert is then raised when an attack signature is identified in the captured traffic. The architecture of an IDS generally includes a plurality of monitoring points called probes, which upload alerts identified in the observed traffic to a management center which analyzes the traffic collected by the probes and correlate the security events so as to refine the detection.

However, it may turn out to be complex, or indeed impossible, to put such a system for detecting intrusions into place in a cloud computing architecture. Indeed, a cloud computing architecture, composed of a plurality of interconnected physical machines, is intended to offer users a plurality of networks, these networks being constructed on the basis of virtual machines hosted by the physical machines of the cloud, the virtual machines being created and released as a function of the needs of the users. Deploying a conventional system for detecting intrusions in such an architecture would therefore make it necessary to deploy in a static and dedicated manner in each of these networks a set of probes able to upload alerts to an alerts management center. Now, positioning probes in a static manner in networks where the resources are created and released on demand in fact poses a problem. Moreover, the measure of volume of information uploaded by these probes, all networks considered, would be such that the information uploaded would be difficult to utilize.

SUMMARY

An embodiment of the invention relates to a method for detecting intrusions on a set of virtual resources in a computing system comprising at least one physical machine hosting said set of virtual resources, characterized in that it comprises the steps of:

calculation of an intrusion detection itinerary defined by a suite of virtual resources of said set, which are integrated and ordered in the suite as a function of respective vulnerability criticality levels assigned to the virtual resources of said set, execution of an operation for detecting intrusions by following the calculated itinerary.

The method according to the invention makes it possible to implement a detection of intrusions on a cloud computing architecture whereas the conventional detection procedures are unsuited to such an architecture.

With the method of the invention, there is performed a sequential control of all or part of the computing resources of the network to be monitored. With respect to a continuous and parallel conventional control of all the computing resources to be monitored, this offers a possibility of switching to the scale of the conventional detection systems. Thus, in comparison to a customary approach where the statically positioned intrusion detection system monitoring facilities monitor the computing resources and continuously generate security information relating to these resources, the control is performed on a temporal sampling of resources. Thus, the volume of data to be processed at a given instant originates from just the computer virtual resource undergoing investigation. It is therefore entirely possible to process this volume of data, whereas the cloud architecture is by definition much more extensive than a conventional network architecture. Thus, this approach therefore enables detection of intrusions in a cloud computing architecture which, by definition, makes a plurality of networks available to users. Moreover, the positioning of intrusion detection probes, which in a conventional system for detecting intrusions is static, is here continually adapted to the virtual resources present.

Advantageously, when the suite which defines the itinerary comprises two resources of respective vulnerability criticality levels n1 and n2, with n1>n2, the resource of criticality level n1 appears in the itinerary a greater number of times than that of the resource of level n2.

The itinerary for visiting the detection control point in charge of operating detection of intrusions at each resource of the itinerary takes account of the vulnerability criticality level associated with each of the virtual resources. Thus, a virtual resource whose vulnerability criticality level is very high is monitored more frequently than a resource whose criticality level is lower. Indeed, the calculation of the itinerary takes account of the criticality levels and thus, a resource may be monitored more often than others and appear in the itinerary several times.

According to one embodiment, when which said set of virtual resources is hosted by a plurality of physical machines and when the itinerary provides for the switch from a first physical machine to a second physical machine, there is provision for:
- a releasing of an intrusion detection control point hosted by the first physical machine,
- an activation of an intrusion detection control point in the form of a virtual machine hosted by the second physical machine.

The intrusion detection control center manages the detection control point and, for a virtual resource of the itinerary which must form the subject of a monitoring, commands the activation of the control point in the guise of virtual machine on the physical machine which hosts the virtual resource. The detection control point thereafter implements a detection of intrusions on the virtual resource, and then the intrusion detection control center releases the detection control point before switching to a following virtual resource of the itinerary.

Advantageously, when the itinerary provides for the switch from a first virtual machine to a second virtual machine, the first and second virtual machines being hosted by the same physical machine, provision is made to use one and the same intrusion detection control point on the two virtual machines.

In an exemplary embodiment, an optimization of the itinerary is undertaken during the detection of intrusions. Thus, if a first resource of the itinerary is on a first physical machine, if a following virtual resource of identical criticality level is on a second physical machine and if a third virtual resource of identical criticality level is on the first physical machine, then the intrusion detection control center modifies the order of the virtual resources of the itinerary in such a way that the intrusion detection control point implements a detection of intrusions on the virtual resources of the first physical machine, in this instance the first and third virtual resources, and then on the virtual resource hosted by the second physical machine. Thus, for equal criticality level, the detection center optimizes the use of the intrusion detection control point and thus avoids an activation and a releasing of the detection control point.

According to the invention, the method comprises a prior step of reception by an intrusion detection control device originating from a tool for evaluating vulnerabilities of a vulnerability indicator associated with the virtual resource.

In an advantageous manner, the step of evaluating the criticality level of a first virtual resource is carried out by aggregation of the vulnerability indicator received for the first resource with at least one vulnerability indicator of a second virtual resource, the second virtual resource having a relationship with the first virtual resource.

To calculate the itinerary, the intrusion detection control center uses, inter alia, security data specific to the virtual resources which advise the intrusion detection control center on the potential vulnerability associated with the active virtual resources present on each physical machine of the architecture. These data are aggregated with other data in such a way as to produce a criticality level of a resource so as to calculate the itinerary of the virtual resources to be monitored.

In one embodiment, the vulnerability indicator associated with a virtual machine is received according to a predefined frequency.

Advantageously, the virtual resource of the itinerary whose associated criticality level is the highest appears in the itinerary a smaller number of times than a predetermined value.

The number of times a virtual resource appears in the itinerary is limited, in such a way that a virtual resource of very high associated criticality level does not monopolize the detection control point. Thus, the method guarantees that all the virtual resources of the environment are monitored.

The invention also relates to a control device for detecting intrusions of a set of virtual resources in a computing system comprising at least one physical machine hosting said set of virtual resources, comprising:
- means for calculating an itinerary, designed to calculate an intrusion detection itinerary defined by a suite of virtual resources to be monitored on the basis of the virtual resources of said set, added to and ordered in the suite as a function of respective vulnerability criticality levels assigned to the virtual resources of said set,
- execution means, designed to execute an operation for detecting intrusions by following the calculated itinerary.

The invention also relates to a system for detecting intrusions on a set of virtual resources in a computing system comprising at least one physical machine hosting said set of virtual resources, comprising:
- an intrusion detection control device according to the invention,
- an intrusion detection control point, adapted for implementing an operation for detecting intrusions on a virtual resource, on demand by the intrusion detection control device.

The invention also pertains to a program on a data medium and loadable into the memory of a computer, the program comprising code portions for the execution of the steps of the method according to the invention, when the program is executed on said computer.

The invention also relates to a data medium on which the computer program according to the invention is recorded.

BRIEF DESCRIPTION OF THE DRAWINGS

Other characteristics and advantages of the present invention will be better understood from the description and appended drawings among which.

DETAILED DESCRIPTION OF ILLUSTRATIVE EMBODIMENTS

Figure 1:
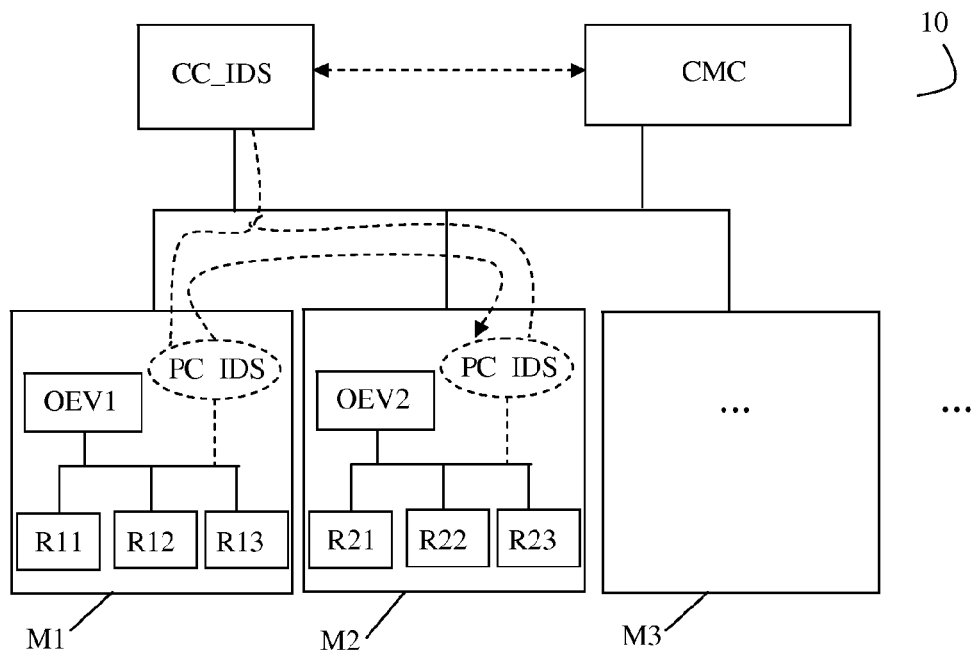
FIG. 1 represents an architecture adapted for implementing an intrusion detection method described in relation to FIG. 2.

FIG. 1 presents a network architecture based on the concept of cloud computing, and adapted for implementing a method for detecting intrusions according to the invention.

In a conventional manner, a network 10 architecture constructed according to a cloud computing model comprises a plurality of physical machines M1, M2, M3, . . . , such as servers, organized as a network. This network 10 is adapted for rendering services S1, S2, S3, . . . (not represented in FIG. 1) to users (not represented) who call upon these services remotely, for example via Internet access. The architecture is very flexible in the sense that resources are allocated on demand, and released when they are no longer used. This flexibility is obtained by virtue of a dematerialization (one customarily speaks of "virtualization") of the operating system of the physical machines. Virtualization consists in dissociating the logical and physical resources of a machine so as to optimize the use of its physical resources. More precisely, virtualization consists in transforming servers, systems, applications into logical entities (or "virtual machine") that can coexist on a single physical machine and in a manner which is quasi-transparent to these servers, systems and applications. Distinct resources, in this instance the servers, systems and applications are thus emulated on the physical machine. With virtualization, the use of the underlying physical resources such as calculation power, memory, is optimized as a function of the demands of the end users.

According to this model, the physical machines M1, M2, M3, . . . host, by way of the virtualization, a plurality of virtual resources R11, R12, R13, R21, R22, R23, . . . . Each of the virtual resources R11, R12, R13, . . . is able to render a service or a group of services to one or more end users. For example the virtual resource R11 corresponds to a data storage application, the virtual resource R12 corresponds to an office suite, the virtual resource R13 corresponds to an instant messaging application.

According to the invention, each physical machine M1, M2, M3, . . . corresponding to a virtual execution environment also hosts a dedicated vulnerabilities evaluation tool OEV1, OEV2, OEV3, . . . . A vulnerabilities evaluation tool, for example OEV1 associated with the virtual environment of the physical machine M1, is adapted for evaluating and uploading to an intrusion detection control center CC_IDS vulnerability indicators associated with the virtual resources hosted on the physical machine M1, in this instance the resources R11, R12 and R13. A vulnerability is a flaw in a system, detrimental to the security of this system and which is liable to be utilized by an attacker to perpetrate an attack. For example, certain vulnerabilities allow an attacker to execute commands without being so authorized, or to illicitly access data to which access is protected. A vulnerability indicator associated with a virtual resource makes it possible to provide an indication of the extent to which the resource is vulnerable to an attack. In this exemplary embodiment, the vulnerability indicator is represented by a numerical value. The higher this value, the more vulnerable the resource. The operating principle of the vulnerabilities evaluation tool is identical to a tool which would operate in a physical environment. Thus, during operation, the vulnerabilities evaluation tool, for example OEV1:

firstly effects a passive discovery of the environment offered by the physical machine M1 which hosts it;
correlates information thus discovered with an existing vulnerabilities base, and then
produces a vulnerability indicator for each active virtual resource of the physical machine. It is recalled that an active resource is a booted resource.

It will be noted from the outset that a vulnerabilities base contains precise, detailed and up-to-date technical information on a set of known vulnerabilities. For example, a known vulnerabilities base is "OSVDB" (for "The Open Source Vulnerability DataBase"). In an OSVDB base, the information relating to a vulnerability comprises a number identifying the vulnerability in a unique manner, a natural language description of the vulnerability, names of off-the-shelf products or of software configurations that are vulnerable, if appropriate their version number, etc.

In a first exemplary embodiment, the passive discovery of the environment offered by the physical machine M1 is effected by the tool OEV1 in a conventional manner by means of passive listening to network traffic emanating from or destined for the virtual machines hosted by the physical machine M1. To this end, the tool OEV1 analyzes fields of the IP datagrams circulating at the level of the physical machine M1, for example at the level of the operating system of the physical machine M1. This analysis allows the tool OEV1 to deduce precise information on the physical machine M1, and more precisely on the active virtual resources hosted by the physical machine M1. Thus, the tool OEV1 detects the presence of a particular operating system, for example Linux, Windows, determines a version number of this system, and also detects the presence of a specific service, for example a messaging service, a storage service. The tool OEV1 thus characterizes the active virtual resources hosted on the physical machine M1 by means of concrete data such as a "MAC" ("Media Access Control") address, an IP address, an operating system, an application.

The tool OEV1 thereafter correlates the information discovered on each of the virtual resources identified on the physical machine M1 with the vulnerabilities base. By contrasting the information obtained during the passive discovery of the virtual resources hosted by the physical machine M1 with the vulnerabilities base, the tool OEV1 identifies virtual resources present on the physical machine M1 which are vulnerable to one or more existing attacks. The tool OEV1 then associates a vulnerability indicator with each of the virtual resources that it has identified on the physical machine M1.

The vulnerabilities evaluation tool, for example OEV1, is therefore adapted for cataloguing the active virtual resources of the physical machine which hosts it and for associating a vulnerability indicator, as described hereinabove, with each of the resources. In an exemplary embodiment, the indicator is a numerical value. The higher this value the more vulnerable the resource.

In another exemplary embodiment, the vulnerabilities evaluation tool observes the accesses to a virtual resource of the physical machine to which it is dedicated and deduces therefrom a vulnerability indicator of the resource. For example, the tool OEV1 effects a statistical analysis of the accesses to the virtual resource R12 and, according to the frequency of these accesses and especially the variability of this frequency, deduces therefrom the vulnerability indicator. If the tool OEV1 notes a strong increase in the frequency of access to the virtual resource R12, then the vulnerability indicator of the resource R12 increases.

The invention is not limited to these procedures for the evaluation of the vulnerability indicators of the virtual resources hosted by a physical machine. Thus, any procedure making it possible to evaluate the vulnerability of computing resources can be used by the evaluation tool.

Figure 2:
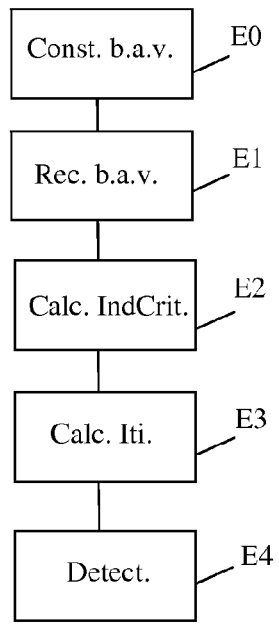
FIG. 2 represents the steps of the method for detecting intrusions according to a first exemplary embodiment.

According to the invention, the network 10 also comprises the intrusion detection control center CC_IDS, designed to implement the method for detecting intrusions described in relation to FIG. 2. In particular, the intrusion detection control center CC_IDS is able to calculate an intrusion detection itinerary defined by a suite of virtual resources to be monitored, and to implement an operation for detecting intrusions on the virtual resources of which the itinerary is composed. To this end, the intrusion detection control center CC_IDS is designed to command at least one intrusion detection control point PC_IDS to monitor the resources of the itinerary. More precisely, the detection control center CC_IDS is adapted for:

creating the detection control point PC_IDS in the form of a virtual machine hosted by a physical machine by reserving the resources necessary for a subsequent activation;

commanding the activation of the detection control point PC_IDS on the physical machine so as to monitor a virtual resource of the itinerary hosted by the physical machine;

commanding the releasing of the detection control point PC_IDS, when the monitoring of the virtual resource has terminated.

The network 10 also comprises a center CMC for managing the architecture of the cloud (for "Cloud computing Management Center"), designed to manage in a global manner all the resources, physical and virtual, of the network 10. The center for managing the architecture of the cloud CMC is thus able to command the creation, the activation and the releasing of virtual resources on physical machines, as a function of the needs of the users. The management center CMC is also designed to provide complementary information on virtual resources of the network 10 to the intrusion detection control center CC_IDS. For example, the management center CMC which possesses a global overview of all the resources of which the architecture of the network 10 is composed is able to provide the detection control center CC_IDS with information on an inactive virtual resource which would be hosted by a physical machine. An inactive resource is a resource which does not communicate with other resources. It may thus not be observed by the vulnerabilities evaluation tool during an operation of passive discovery of the environment offered by a physical machine. In this manner, the detection control center CC_IDS can take account of this inactive resource during the calculation of the itinerary of the resources to be monitored.

The steps of a method for detecting intrusions in a network 10 in accordance with a cloud computing architecture, according to a particular embodiment, will now be described in relation to FIG. 2.

The network 10 complies with a cloud computing architecture such as described in relation to FIG. 1.

In an initial step E0 of constructing a vulnerabilities audit base and of dispatch, the vulnerabilities evaluation tool OEV1 dedicated to the physical machine M1 constructs a vulnerabilities audit base associated with the virtual resources R11, R12, R13, . . . present on the physical machine M1. To this end, and in accordance with the operation of the vulnerabilities evaluation tool described in relation to FIG. 1, the tool OEV1:

effects a passive discovery of the virtual environment of the physical machine M1 which hosts it. For example, the tool OEV1 uses a passive scanner of vulnerabilities to analyze the datagrams of the IP frames which circulate on the physical machine M1 so as to identify the characteristics of the active virtual resources present on the physical machine M1, and then correlates the characteristics thus discovered with an existing vulnerabilities base, so as to allot a vulnerability indicator to each of the virtual resources identified. The vulnerabilities audit base records for each of the active virtual resources observed on the physical machine M1, in this instance R11, R12, R13, . . . , a security datum comprising an identifier of the virtual resource and the associated vulnerability indicator.

At the end of the construction and dispatch step E0, the tool OEV1 dispatches to the intrusion detection control center CC_IDS the vulnerabilities audit base which comprises the set of security data relating to the resources.

Step E0 of constructing the vulnerabilities audit base and of dispatch is executed periodically, according to a period which is parameterizable at the level of the intrusion detection control center CC_IDS. During a subsequent execution of this construction and dispatch step E0, the vulnerabilities audit base is updated. This periodic execution of step E0 thus allows the tool OEV1 to take into account the activation or the releasing of virtual resources on the physical machine M1. Such activation and releasing operations are inherent to a cloud computing architecture.

The construction and dispatch step E0 is described with respect to the physical machine M1. Of course, what happens on the physical machine M1 happens in the same way on the physical machines M2, M3, . . . by means of the respective vulnerabilities evaluation tools OEV2, OEV3, . . . .

In a step E1 of receiving the security data, the intrusion detection center CC_IDS receives from the vulnerabilities evaluation tools OEV1, OEV2, OEV3, . . . the vulnerabilities audit bases for the environments offered by the physical machines M1, M2, M3, . . . dispatched during the previous step E0. Thus, the detection center CC_IDS receives the vulnerability indicators of all the active virtual resources in the network 10.

In a step E2 of calculating criticality levels, the detection center CC_IDS calculates a criticality level of the vulnerability for each active virtual resource of the network 10 for which the detection center CC_IDS has received a vulnerability indicator. The criticality of a vulnerability associated with a resource is related to the severity, or the seriousness, of a security incident when it occurs on the resource. Thus, a virtual resource, for example an application, may be intrinsically not very vulnerable: such is the case for a supervised application, updated regularly and on which software for correcting a security bug is regularly installed (one customarily speaks of a security patch). However, the residual vulnerability may remain very critical: such is the case for example for an application aimed at data confidentiality.

A vulnerability criticality level associated with a virtual resource is for example a numerical value ranging from 1 to 4: the higher the value, the more significant the criticality of the vulnerability.

In order to calculate the criticality level of a vulnerability associated with a virtual resource, the detection center CC_IDS aggregates the resource's vulnerability indicator established by the vulnerabilities evaluation tool OEV1 in the course of step E0 with different indicators, which include:

the vulnerability indicator of other virtual resources which have a relationship with the virtual resource. A first virtual resource is said to have a relationship with a second virtual resource if for example it is situated on one and the same network constructed on the architecture of the cloud, or if it exchanges data with this second resource so as to provide it with a service, or if it coexists with this second virtual resource on one and the same physical machine. Indeed, the relationships between virtual resources can influence the criticality of a vulnerability associated with a virtual resource. Thus, the more a vulnerable virtual resource sustains relationships with other resources that are themselves vulnerable, the more the criticality of its vulnerability increases. The other virtual resources constitute the close environment of the virtual resource. Thus, the more vulnerable this environment, the more the impact of a security incident risks being significant for the virtual resource concerned. The knowledge of the other virtual resources which have a relationship with the virtual resource is provided by the center CMC for managing the architecture of the cloud which possesses a global overview of the whole of the architecture of the network 10 and of its resources. Once the virtual resources have been identified, the intrusion detection control center CC_IDS accesses these resources' vulnerability indicators which have been uploaded to it in the course of step E1 of reception by the vulnerability evaluation tools dedicated to the physical machines which host the other virtual resources;

a service quality level associated with the virtual resource. This service quality level forms in general the subject of a contract between the service provider that operates a network in order to offer a service, and a user who has subscribed to the service. If the contractualized level of service quality is high, then the criticality of the vulnerability associated with the resource increases. For example, a high service quality level is in general demanded for a real-time resource, for example a video streaming application;

any indicator making it possible to intervene in the definition of the criticality of the vulnerability associated with the resource. For example, a second security datum relating to the current virtual resource is obtained during a subsequent detection step E4. This second datum can intervene, in the guise of second vulnerability indicator associated with the virtual resource in the calculation of the criticality level.

Upon the conclusion of this step E2 of calculating criticality levels, the detection control center CC_IDS possesses a list of active virtual resources of the network 10 and, for each of these resources, an associated level of criticality of the vulnerability.

In a step E3 of calculating an itinerary, the detection center CC_IDS calculates an itinerary composed of a suite of active virtual resources to be monitored which form part of the list obtained upon the conclusion of step E2 of calculating criticality indicators. The itinerary comprises all the active virtual resources of the list obtained in the course of step E2 and which must be monitored by a detection control point PC_IDS able to implement a detection of intrusions. The resources appear at least once in the itinerary, as a function of their criticality level. During the implementation of an operation for detecting intrusions, the detection control point PC_IDS, commanded by the detection control center CC_IDS, traverses the itinerary and implements a detection of intrusions successively on each resource of the itinerary.

During step E3, the intrusion detection control center CC_IDS constructs the itinerary while taking account of the vulnerability criticality levels associated with each virtual resource, calculated in the course of step E2. The itinerary for detecting intrusions is defined by a suite of virtual resources of the list of virtual resources obtained in step E2, which are integrated and ordered in the suite as a function of the respective vulnerability criticality levels assigned to the virtual resources. A resource may appear several times in the itinerary, if its criticality level is significant. Thus, a first resource whose criticality level is high will appear several times in the itinerary and will therefore be monitored more often by a detection control point PC_IDS than a second resource whose associated criticality level is lower and which, therefore, will be monitored for example only once in the itinerary.

To illustrate the construction of the itinerary, let us assume that the detection control center CC_IDS has calculated for the active virtual resources R11, R12, R13 and R21 the following respective criticality levels: 1, 2, 1, 4. In this example, the vulnerability of the resource R21 is therefore very critical, that of the resources R11 and R13 is much less so. An exemplary itinerary consistent with the respective criticality indicators of the resources is: R21-R11-R21-R12-R21-R13-R21-R12. In this itinerary, the resource R21 appears four times as often as the resource R11; it is therefore destined to be visited four times as often by the intrusion detection control point PC_IDS as the resource R11, of less critical vulnerability. It is noted that a virtual resource may be visited several times, while others are visited just once.

In another exemplary embodiment, the frequency of appearance of a virtual resource in an itinerary is limited to a predetermined value, so as to prevent a virtual resource of very high associated criticality indicator from monopolizing the detection control point PC_IDS.

In the following detection step E4, the detection center CC_IDS commands the implementation of an operation for detecting intrusions on the virtual resources of which the itinerary calculated in the course of the previous step is composed. To this end, for a current virtual resource of the itinerary, the intrusion detection control center CC_IDS commands the activation of an intrusion detection virtual machine previously created on the physical machine which hosts the current resource. This virtual detection machine, called a detection control point PC_IDS, is a system for detecting intrusions which is intended to monitor the current virtual resource during a given time period, parameterized by the detection control center CC_IDS. For example, the detection control point PC_IDS performs a detection of intrusions on the current resource according to a different procedure from that used by the tool for evaluating vulnerabilities in the course of step E0. For example, the detection control point PC_IDS makes a scan of the open ports of the current virtual resource. Such a scan of ports makes it possible to bring to the fore vulnerabilities not detected by the vulnerabilities evaluation tool in the course of step E0. The intrusion detection operated on the current virtual resource allows the detection control point PC_IDS to allot a second vulnerability indicator to the current virtual resource. A second security datum comprising the identifier of the current virtual resource and the second vulnerability indicator is then transmitted to the detection control center CC_IDS. This second security datum can be used during a subsequent execution of steps E2 of calculating the criticality levels and E3 of calculating an itinerary so as to update the itinerary if appropriate. Upon the conclusion of a determined period, the detection center CC_IDS commands the releasing of the virtual machine which constitutes the control point PC_IDS and repeats the detection step E4 for a following resource of the itinerary. Thus, the detection control center CC_IDS commands the displacement and the implementation of the control point PC_IDS along the calculated itinerary. The detection control point PC_IDS thus constitutes a mobile detection system, commanded by the intrusion detection control center CC_IDS and monitoring virtual resources by following the calculated itinerary.

In another exemplary embodiment, the system for detecting intrusions uses an active scanner of vulnerabilities. The active scanners interact directly with the target by dispatching malicious packets so as to test for the presence or the absence of vulnerabilities.

Moreover, as in a conventional system for detecting intrusions, the result of this detection is uploaded in the form of alerts to an operator of the detection center CC_IDS that can if appropriate implement reaction measures.

The time during which a virtual resource is monitored by means of the control point PC_IDS is parameterizable at the level of the detection center CC_IDS.

Likewise, the duration for which the detection step E4 is implemented is parameterizable. It is thus understood that one and the same itinerary, calculated in the course of step E3, may be traversed several times before a new cycle of steps E0 to E4 is executed.

It is thus understood that steps E0 to E4 are repeated over time. Steps E0 and E4 make it possible to take account of the activation or/and of the releasing of virtual resources, and to best update the itinerary with respect to the virtual resources present at a given instant.

In an exemplary embodiment, the time during which a resource is monitored by the control point PC_IDS in the course of the detection step E4 depends on the vulnerability criticality level associated with a resource; thus, the higher this indicator, the higher the monitoring time.

In a variant embodiment, the detection control center CC_IDS limits the mobility of a control point PC_IDS between various physical machines. Thus, if a first virtual resource of the itinerary is hosted on a first physical machine, if a second virtual resource of identical criticality level which follows the first resource in the itinerary is on a second physical machine, and if a third virtual resource to be monitored of identical criticality level is on the first physical machine, then the itinerary is optimized in such a way as to reverse the order in which the second and third virtual resources to be monitored appear. Thus, the detection control point PC_IDS will monitor the first resource, then the third resource, both being hosted by the same physical machine. Thus, the virtual machine associated with the detection control point PC_IDS is activated a first time on the first physical machine and a second time on the second physical machine, instead of three times.

In another exemplary embodiment, the intrusion detection control center CC_IDS manages a plurality of detection control points PC_IDS so as to optimize the system's intrusion detection capabilities. Thus, detection is optimized in the sense that operations for monitoring virtual resources take place in parallel. The number of control points PC_IDS that can simultaneously be in operation depends for example on the capabilities of the detection control center CC_IDS, on a measure of volume of uploaded alerts, on a number of active virtual resources.

Thus, in contradistinction to a conventional system for detecting intrusions which positions static probes at precise points of a network to be observed and which analyzes all the alerts uploaded by these probes, the system for detecting intrusions according to the invention on the one hand prioritizes the alerts that it wishes to receive and analyze as a function of the vulnerability criticality level of a virtual resource, and on the other hand samples these alerts by concerning itself successively with the virtual machines which figure in the itinerary.

Moreover, the itinerary can be recalculated. Thus, the center CMC for managing the security of the architecture of the cloud takes into account any modification which occurs in the virtual resources of the cloud: appearance of a virtual machine subsequent to a user request, or releasing of a virtual resource which is no longer requested.

Figure 3:
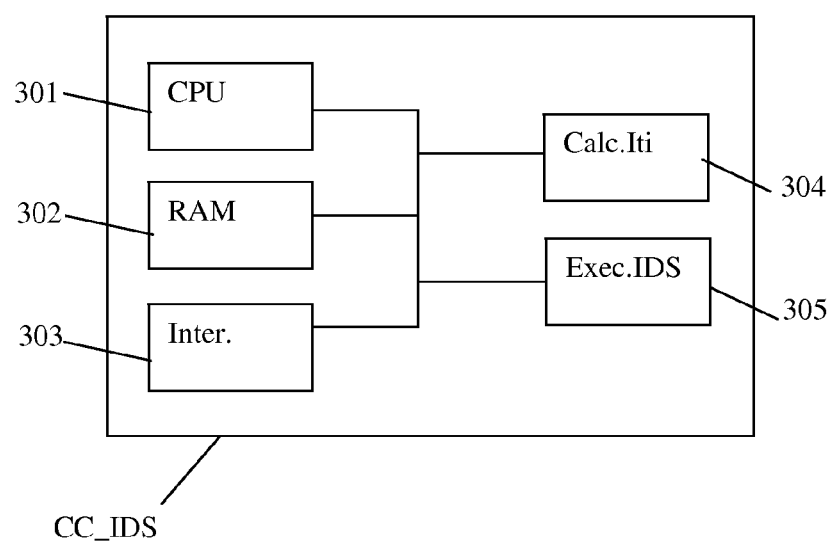
FIG. 3 is a diagram of a control device for the detection of intrusions, according to a first exemplary embodiment of the invention.

An intrusion detection control device CC_IDS will now be described in relation to FIG. 3.

Such a detection control device CC_IDS is an item of computing equipment such as a terminal, or a server. A detection control device CC_IDS is able to calculate an itinerary composed of active virtual resources of the cloud computing architecture to be monitored, and to command a detection control point PC_IDS in such a way that the control point implements a detection of intrusions on a resource of the itinerary. The detection control device CC_IDS comprises:

- a microprocessor 301, or "CPU" ("Central Processing Unit"), intended to load instructions into memory, to execute them, to perform operations;
- a set of memories, including a volatile memory 302, or "RAM" ("Random Access Memory") used to execute code instructions, store variables, etc.;
- communication interfaces 303, adapted for communicating with the center CMC for managing the architecture of the cloud. In particular, the detection control device CC_IDS uses these interfaces to receive from the vulnerabilities evaluation tools dedicated to each of the physical machines, the security data associated with the active virtual resources on the physical machines. The detection control device CC_IDS can also obtain from the management center CMC security information on virtual resources of the cloud for which the vulnerabilities evaluation tools have not provided any security data; this may be the case for virtual resources which do not communicate during the passive evaluation implemented by the vulnerabilities evaluation tools. The communication interfaces 303 also allow the intrusion detection control device CC_IDS to command the detection control point PC_IDS;
- a module 304 for calculating an itinerary, adapted for calculating an intrusion detection itinerary. The itinerary is defined by a suite of virtual resources to be monitored, ordered according to their respective vulnerability criticality level. A resource of the itinerary may appear several times if its associated criticality level is high. Indeed, in this case, the resource is monitored by the control point PC_IDS more often than a resource of lower criticality. The calculation module 304 is designed to implement step E3 of calculating the itinerary of the detection method described previously;
- an execution module 305, designed to execute an operation of detecting intrusions by following the calculated itinerary. The execution module 305 is thus adapted for commanding the activation and the releasing of a detection control point PC_IDS in the guise of virtual machine on the physical machine which hosts a current virtual resource of the itinerary, for launching the detection of intrusions of the detection control point, and for releasing the detection control point PC_IDS, once the detection of intrusions has been implemented. The time during which the detection of intrusions is implemented by the control point PC_IDS is managed by the detection control device CC_IDS. The execution module 305 is designed to implement step E4 of detection of the method described previously.

The network interfaces 303, the module 304 for calculating an itinerary and the module 305 for executing the operation for detecting intrusions are preferably software modules comprising software instructions for executing the steps of the intrusion detection method described previously.

The invention therefore also relates to:
- a computer program comprising instructions for the implementation of the detection method such as described previously when this program is executed by a processor of the detection center device;
- a readable recording medium on which the computer program described hereinabove is recorded.

The software modules can be stored in, or transmitted by a data medium. The latter can be a hardware storage medium, for example a CD-ROM, a magnetic diskette or a hard disk, or else a transmission medium such as a signal or a telecommunication network.

The invention also relates to a system for detecting intrusions comprising an intrusion detection control device CC_IDS according to the invention and an intrusion detection control point PC_IDS, adapted for implementing an operation of detecting intrusions on a virtual resource, on demand by the detection device.

Although the present disclosure has been described with reference to one or more examples, workers skilled in the art will recognize that changes may be made in form and detail without departing from the scope of the disclosure and/or the appended claims.

The invention claimed is:

1. A method comprising:
   detecting intrusions on a set of virtual resources in a computing system comprising at least two physical machines hosting said set of virtual resources, wherein the detecting is implemented by an intrusion detection control device and the detecting comprises steps of:
   calculation of an intrusion detection itinerary defined by a suite of virtual resources of said set, which are integrated and ordered in the suite as a function of respective vulnerability criticality levels assigned to the virtual resources of said set, and
   execution of an operation for detecting intrusions by following the calculated itinerary,
   wherein the method includes, when the itinerary comprises, in order:
   a first resource with a specific vulnerability criticality level, said first resource being hosted by a first physical machine,
   a second resource with the same vulnerability criticality level as the first resource, said second resource being hosted by a second physical machine, and
   a third resource with the same vulnerability criticality level as the first and the second resources, said third resource being hosted by the first physical machine,
   the order of the second and the third resources in the itinerary is changed in order to execute the operation of intrusion detection first on the first physical machine for first and third resources and next on the second physical machine for the second resource.

2. The method as claimed in claim 1, in which the suite comprises two resources of respective vulnerability criticality levels n1 and n2, with n1>n2, the resource of criticality level n1 appears in the itinerary a greater number of times than that of the resource of level n2.

3. The method as claimed in claim 1, wherein the method includes, when the itinerary provides for a switch from the first resource hosted by the first physical machine to the second resource hosted by the second physical machine different from the first physical machine:
   a releasing of an intrusion detection control point hosted by the first physical machine which hosts the first resource, and
   an activation of an intrusion detection control point in the form of a virtual machine hosted by the second physical machine which hosts the second resource.

4. The method as claimed in claim 1, in which the method further comprises, when the itinerary provides for a switch from a first virtual machine to a second virtual machine, the first and second virtual machines being hosted by the same physical machine, using one and the same intrusion detection control point on the two virtual machines.

5. The method as claimed in claim 1, comprising a step of reception by the intrusion detection control device originating from a tool for evaluating vulnerabilities of a vulnerability indicator associated with a virtual resource.

6. The method as claimed in claim 5, comprising a step of evaluating, by the intrusion detection control device, a vulnerability criticality level of a virtual resource, which is a first virtual resource, is carried out by aggregation of a vulnerability indicator received for the first virtual resource with at least one vulnerability indicator of a second virtual resource, the second virtual resource having a relationship with the first virtual resource.

7. The method as claimed in claim 5, in which the vulnerability indicator associated with a virtual machine is received by the intrusion detection control device according to a predefined frequency.

8. The method as claimed in claim 1, in which a virtual resource of the itinerary whose associated criticality level is the highest appears in the itinerary a smaller number of times than a predetermined value.

9. An apparatus comprising:
   a control device for detecting intrusions on a set of virtual resources in a computing system comprising at least two physical machines hosting said set of virtual resources, the control device comprising:
   a processing unit,
   memory, comprising:
   instructions executable by the processing unit to calculate an itinerary, designed to calculate an intrusion detection itinerary defined by a suite of virtual resources to be monitored on the basis of the virtual resources of said set, added to and ordered in the suite as a function of respective vulnerability criticality levels assigned to the virtual resources of said set,
   instructions executable by the processing unit to detect intrusions by following the calculated itinerary, and
   instructions executable by the processing unit to change the order of virtual resources in the itinerary when the itinerary comprises, in order:

a first resource with a specific vulnerability criticality level, said first resource being hosted by a first physical machine, a second resource with the same vulnerability criticality level as the first resource, said second resource being hosted by a second physical machine, and a third resource with the same vulnerability criticality level as the first and the second resources, said third resource being hosted by the first physical machine, the order of the second and the third resources in the itinerary being changed in order to execute the operation for intrusion detection first on the first physical machine for the first and third resources and next on the second physical machine for the second resource.

10. The apparatus of claim 9, further comprising:

an intrusion detection control point, configured to implement an operation for detecting intrusions on a virtual resource, on demand by the intrusion detection control device.

11. A hardware storage medium comprising a program recorded thereon and loadable into memory of a computer, the program comprising code portions for execution of a method, when the program is executed on said computer, wherein the method comprises:

detecting intrusions on a set of virtual resources in a computing system comprising at least two physical machines hosting said set of virtual resources, wherein detecting comprises steps of:

calculation of an intrusion detection itinerary defined by a suite of virtual resources of said set, which are integrated and ordered in the suite as a function of respective vulnerability criticality levels assigned to the virtual resources of said set, and execution of an operation of detecting intrusions by following the calculated itinerary, wherein the method includes when the itinerary comprises, in order:

a first resource with a specific vulnerability criticality level, said first resource being hosted by a first physical machine, a second resource with the same vulnerability criticality level as the first resource, said second resource being hosted by a second physical machine, and a third resource with the same vulnerability criticality level as the first and the second resources, said third resource being hosted by the first physical machine, the order of the second and the third resources in the itinerary is changed in order to execute the operation of detecting intrusions first on the first physical machine for first and third resources and next on the second physical machine for the second resource.

* * * * *